US008503939B2

(12) United States Patent
Bray

(10) Patent No.: US 8,503,939 B2
(45) Date of Patent: Aug. 6, 2013

(54) METHOD FOR HANDLING COMMUNICATION BETWEEN A USER EQUIPMENT AND A RADIO NETWORK CONTROLLER AND PROGRAM FOR CONTROLLING A RADIO NETWORK CONTROLLER

(75) Inventor: Jeremy Bray, St. Albans (GB)

(73) Assignee: Deutsche Telekom (UK) Limited, Hatfield (GB)

( * ) Notice: Subject to any disclaimer, the term of this patent is extended or adjusted under 35 U.S.C. 154(b) by 0 days.

(21) Appl. No.: 13/381,134

(22) PCT Filed: Jun. 16, 2010

(86) PCT No.: PCT/EP2010/003616
§ 371 (c)(1),
(2), (4) Date: Dec. 28, 2011

(87) PCT Pub. No.: WO2011/000475
PCT Pub. Date: Jan. 6, 2011

(65) Prior Publication Data
US 2012/0108256 A1 May 3, 2012

Related U.S. Application Data

(60) Provisional application No. 61/221,856, filed on Jun. 30, 2009.

(30) Foreign Application Priority Data

Jun. 30, 2009 (EP) .................................... 09008533

(51) Int. Cl.
*H04B 1/00* (2006.01)

(52) U.S. Cl.
USPC ........... 455/63.1; 455/501; 455/450; 370/338

(58) Field of Classification Search
USPC .......................... 455/63.1, 501, 450; 370/338
See application file for complete search history.

(56) References Cited

U.S. PATENT DOCUMENTS

| 2003/0207699 A1* | 11/2003 | Shpak .......................... 455/525 |
| 2004/0090944 A1* | 5/2004 | Ueno ............................ 370/338 |
| 2005/0018706 A1* | 1/2005 | Myojo ......................... 370/445 |

(Continued)

FOREIGN PATENT DOCUMENTS

| EP | 2077685 A1 | 7/2009 |
| WO | WO 2005125232 A2 | 12/2005 |

OTHER PUBLICATIONS

European Patent Office, International Search Report in International Patent Application No. PCT/EP2010/003616 (Jun. 8, 2010).

*Primary Examiner* — Danh Le
(74) *Attorney, Agent, or Firm* — Leydig, Voit & Mayer, Ltd.

(57) ABSTRACT

A method for handling communication between a user equipment and a radio network controller of an UMTS (Universal Mobile Telecommunications System) radio access network includes: providing a transmission instruction by the radio network controller for redirecting the user equipment to a target carrier frequency, the target carrier frequency being an allowed frequency of a local access radio network; evaluating if the target carrier frequency is interfered by the local access radio network near the user equipment; and preventing a redirection of the user equipment to the target carrier frequency by the radio network controller for a certain time period, if the target carrier frequency is interfered by the local access network near the user equipment.

13 Claims, 1 Drawing Sheet

U.S. PATENT DOCUMENTS

| | | | |
|---|---|---|---|
| 2008/0102784 A1* | 5/2008 | Mittal et al. | 455/404.1 |
| 2009/0046632 A1 | 2/2009 | Nanda et al. | |
| 2009/0092122 A1 | 4/2009 | Czaja et al. | |
| 2009/0232080 A1* | 9/2009 | Ahn et al. | 370/329 |
| 2009/0274193 A1* | 11/2009 | Kizu et al. | 375/133 |
| 2009/0296854 A1* | 12/2009 | Yamano et al. | 375/296 |

* cited by examiner

METHOD FOR HANDLING COMMUNICATION BETWEEN A USER EQUIPMENT AND A RADIO NETWORK CONTROLLER AND PROGRAM FOR CONTROLLING A RADIO NETWORK CONTROLLER

CROSS-REFERENCE TO RELATED APPLICATIONS

This patent application is a national stage entry under 35 U.S.C. §371 of International Application No. PCT/EP2010/003616, filed Jun. 16, 2010, and claims priority to European Patent Application No. EP09008533.3, filed Jun. 30, 2009, and U.S. Provisional Patent Application No. 61/221,856, filed Jun. 30, 2009.

FIELD

The present invention relates to a method for handling communication between a user equipment (UE) and a radio network controller (RNC). The user equipment and the radio network controller have to determine common transfer parameters, like a common carrier frequency for sending and receiving Radio Resource Control (RRC) messages bi-directionally.

BACKGROUND

More and more people use their mobile devices and in particular their cellular phones (also referred to as user equipment (UE)) not only on the move, but also at home or in the office. As a result, an increasing number of local access networks are installed to provide these mobile devices with sufficient bandwidth and data transfer rates even in buildings or out of the service areas of macro cells. Typical macro cells are radio cells of the UMTS Terrestrial Radio Access Network (UTRAN) or the GSM/EDGE Radio Access Network (GERAN). The local access networks are pico- or femtocells, for instance. These local access networks cover small areas compared to the macro cells, such as in trains, aircrafts, ferries and building, like offices, private houses, shopping malls, train stations, airports and the like. An example of such a femtocell is described in US Patent Publication No. 2009/0092122 A1.

The above mentioned local access networks operate in parallel to the macro cells. As a result, there is usually a certain overlap between the local access network and the access network of the macro cells. In the case that the user equipment is located in the service area of a local access area network and does not have access to this local access area network, a data transfer between the radio network controller of the macro cell and the user equipment could potentially be disturbed by interference with the local access network (referred to as co-channel interference). In particular, if the carrier frequency for data transfers between the user equipment and the radio network controller is in the proximity of a frequency which is allowed for access to the local area network. An access to a femto network is not allowed, when the maximum amount of mobile devices in the femto network has already been reached, for instance.

This co-channel interference between the femto network and the macro network results in a "dead-zone" for "non-femto" user equipment in close proximity to the femto network and a "grey-zone" at the edge of femto coverage where macro quality can still be impaired. Normally in such cases the interfered macro base transceiver station (or Node B) will have at least one other frequency to serve the affected "non-femto" user equipment. The problem is that the radio network controller is not aware of the interference that "non-femto" user equipment may be experiencing near a disallowed femto network.

During the state transition from RRC idle to cell_DCH, or from cell_FACH to cell_DCH, the radio network controller has the option to redirect individual user equipment to a different UTRA cell by specifying the IE (information element) "Frequency info" in the RRC connection setup or Radio Bearer Reconfiguration message, respectively. However, at that point the radio network controller does not know if individual user equipment cannot or should not use that other frequency due to interference from the femto network. In the case that the target frequency of the RRC connection setup or the Radio Bearer Reconfiguration message is interfered by the local access network, the user equipment is not able to answer the radio network controller on the target frequency. Consequently, the radio network controller has to generate an additional RRC connection setup (and prior the user equipment has to transmit an additional connection request, respectively) or the radio network controller has to transmit a further Radio Bearer Reconfiguration message each concerning the clear frequency. This adds delay to the call setup time or to the Radio Bearer Reconfiguration time, each time.

Furthermore, there is a risk of a ping-pong scenario based on multiple inter-frequency handovers triggered by the radio network controller, wherein an inter-frequency handover from the clear frequency to the interfered frequency may be successful (for a short time), but shortly followed by an inter-frequency handover back to the clear frequency due to poor quality on the interfered frequency caused by interference with the femto network.

SUMMARY

In an embodiment, the present invention provides a method for handling communication between a user equipment and a radio network controller of a universal mobile telecommunications system radio access network. The method includes: providing a transmission instruction by the radio network controller for redirecting the user equipment to a target carrier frequency, the target carrier frequency being an allowed frequency of a local access radio network; evaluating if the target carrier frequency is interfered by the local access radio network near the user equipment; and preventing a redirection of the user equipment to the target carrier frequency by the radio network controller for a certain time period, if the target carrier frequency is interfered by the local access network near the user equipment.

DETAILED DESCRIPTION

Figure 1:
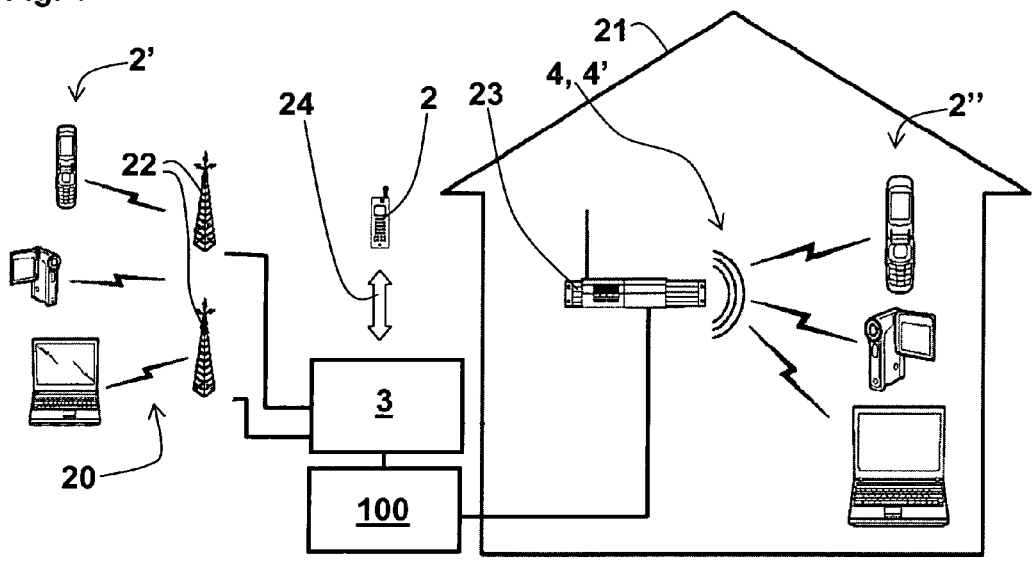
FIG. 1 illustrates schematically an exemplary architecture of a mobile radio network comprising macro networks and a local radio access network.

In embodiments of the present invention, a method is provided for handling communication between user equipment and a radio network controller, as well as a program and a computer program product for controlling a radio network controller to prevent redirection of the user equipment to co-channel frequencies interfered by the local access network.

In an embodiment, the method comprises the steps of providing a transmission instruction by the radio network controller for redirecting the user equipment to a certain target carrier frequency, evaluating if the target carrier frequency is interfered by a local access radio network near the user equipment and preventing a redirection of the user equipment to the target carrier frequency by the radio network controller for a certain time period, if the target carrier frequency is interfered by the local access network near the user equipment.

It is thereby advantageously possible that the radio network controller identifies a user equipment which is not able to operate on the directed target carrier frequency due to interference with a local access area network. As a result, a redirection of the user equipment to the target carrier frequency is prevented for the certain time period, so that a communication between the user equipment and the radio network controller via a clear frequency is maintained. The risk of time delays, quality disturbance, call drops, ping-pong handovers and interference into the local access network coverage can securely be avoided. In an embodiment, the target carrier frequency features a frequency allowed for access to the local access network. Particularly, the corresponding parameters of the local access network, like frequencies and scrambling codes, have to be provided to the radio network controller. In an embodiment, the local access network comprises a femto cell and the target carrier frequency comprises an allowed femto frequency for the femto cell, wherein the transmission instruction is generated in such a manner, that a redirection of the user equipment to a target carrier frequency used by the femto cell is prevented, when the user equipment is located in the proximity of the femto cell and does not have access to the femto cell.

In an embodiment, the transmission instruction comprises a connection setup transmitted from the radio network controller to the user equipment, wherein the step of providing the transmission instruction is caused by a first connection request transmitted from the user equipment to the radio network controller and wherein the step of evaluating if the target carrier frequency is interfered by the local access radio network near the user equipment comprises a step of detecting if a second connection request of the user equipment is received by the radio network controller after transmitting a transmission instruction to the user equipment for redirecting the user equipment to the target carrier frequency, wherein the second connection request is effectively equal to the first connection request. The phrase "the second connection request is effectively equal to the first connection request" means that the second connection request is a duplicate RRC connection request from the User Equipment (UE). However, there are a number of fields in this second connection request message which the UE may set differently (with respect to the first connection request). These parameters, e.g. include:

the establishment_cause parameter,
the initial_ue_identity parameter, and/or
parameters of the group of "measuredResultsOnRach".

If the radio network controller detects the second connection request of the same user equipment, shortly after the radio network controller transmitted a connection setup to the user equipment with a target frequency allowed for access to the local access network as a result of a preceding first connection request of the user equipment (which is equal to the second connection request), the radio network controller is able to identify this user equipment as a "non-femto" user equipment (user equipment with no access to the local access network). Consequently, the radio network controller "knows" that the non-femto user equipment is located in the "grey-zone" or in the "dead-zone" of the femto network and beneficially prevents further redirection of this user equipment to the target frequency for a certain time period.

In an embodiment, the transmission instruction comprises a Radio Bearer Reconfiguration message for the user equipment, wherein the step of evaluating if the target carrier frequency is interfered by the local access radio network near the user equipment comprises a step of detecting if one or more unsuccessful Radio Bearer Reconfiguration messages have been subsequently transmitted to the user equipment for redirecting the user equipment to the target carrier frequency. If the radio network controller does not receive a message from the user equipment that a Radio Bearer Reconfiguration has been successfully performed by the user equipment, shortly after the radio network controller transmitted one or more Radio Bearer Reconfiguration message with a target frequency allowed for access to the local access network, the radio network controller is able to identify this user equipment as a user equipment located near or inside the service area of the local access network (e.g. "non-femto" UE in "grey-zone" or "dead-zone"). Consequently, the radio network controller is capable of preventing further redirection of this user equipment to the target frequency for a certain time period.

In an embodiment, the step of evaluating if the target carrier frequency is interfered by the local access radio network near the user equipment comprises a step of detecting if the user equipment performs a certain number of ping-pong inter-frequency handovers from a clear carrier frequency to the target carrier frequency and back from the target carrier frequency to the clear frequency. Advantageously, the radio network controller is able to detect that the user equipment remains in the "grey-zone" of the local access network.

In an embodiment, the method comprises a step of initiating inter-frequency measurements performed by the user equipment concerning the target carrier frequency and the scrambling codes of the local access radio network and a step of evaluating a signal strength and/or a signal quality in the inter-frequency measurements of the user equipment. Advantageously, the risk of interference between the local access network and the target frequency can directly be derived from the measurements performed by the user equipment. In a further embodiment, these steps are performed, after the radio network controller detects that the target carrier frequency is at least temporarily interfered by the local access radio network, particularly by detecting inter-frequency handovers or an unsuccessful Radio Bearer Reconfiguration, as mentioned above. The inter-frequency measurements are mainly performed subsequently to check in a quantitative manner, how interference with a local access radio network impacts the quality of the target frequency between the radio network controller and the user equipment. It is further advantageous that the radio network controller is able to assess if the user equipment is in the "dead-zone" (inside the service area of the local access radio network) or in the "grey-zone" (near the service area of the local access radio network) of the local access network. If the user equipment is located in the "dead-zone" a longer time period for preventing a redirection of the user equipment to the target frequency could be provided compared to the time period related to the "grey-zone", for instance.

In an embodiment, the redirection of the user equipment to the target frequency is prevented for a certain time period and in particular for a certain hysteresis time. In a further embodiment, the hysteresis time is a static value or depends on certain parameters, wherein the parameters may comprise a nominal hysteresis time, a recent mobility history of the user equipment, a signal strength and quality concerning the target carrier frequency and scrambling codes of the local access radio network and/or the like. Advantageously, the length of the time period can be adapted to individual needs. In an embodiment, the time period is provided in dependency of a recent mobility history of the user equipment. This means that a long time period is provided when the user equipment remains in the "grey-zone" or in the "dead-zone" already for a comparatively long term (e.g. a cellular phone during night) and a short time period is provided when the user equipment remains in the "grey-zone" or in the "dead-zone" only for a short term (e.g. cellular phone of a postman).

In another embodiment, a program for controlling a radio network controller is provided, wherein the program provides a transmission instruction for redirecting a user equipment to a certain target carrier frequency and evaluates if the target carrier frequency is interfered by a local access radio network, wherein a redirection to the target carrier frequency is prevented for a certain time period, if an interference between the local access network near the user equipment and the target carrier frequency is detected. Advantageously, the program instructs the radio network controller to perform the above mentioned method in order to achieve the above mentioned advantages in comparison to the state of the art.

In another embodiment, a computer program product is provided that comprises a program controlling a radio network controller as mentioned above.

These and other characteristics, features and advantages of the present invention will become apparent from the following detailed description, taken in conjunction with the accompanying drawings, which illustrate, by way of example, the principles of exemplary embodiments of the invention. The description is given for the sake of example only, without limiting the scope of the invention. The reference figures quoted below refer to the attached drawings.

The present invention will be described with respect to particular exemplary embodiments and with reference to certain drawings, but the invention is not limited thereto. The invention is limited only by the claims. The drawings described are merely exemplary and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, an exemplary architecture of a conventional UMTS Terrestrial Radio Access (UTRA) network comprising macro cells 20 and a local radio access network 4 is illustrated. The local radio access network 4 is integrated into a home 21 and coupled to the core network 100 of the UMTS Terrestrial Radio Access network. The UMTS Terrestrial Radio Access network comprises a radio network controller 3 connected with the core network 100 and coupled to base transceiver stations 22 (BTS or Node B) of the cellular service provider providing the macro cells 20 for the cellular mobile network. Each base transceiver station 22 contains radio frequency transmitters and receivers used to communicate directly with user equipment 2', like cellular phones, notebooks and the like, which move freely around it. The term "local radio access network" include typical definitions of femto cells, home base stations, personal access points (PAPs) and personal 3G base stations, as known from the prior art. For exemplary purpose, the local access radio network 4 features a femto cell 4' with a local femto cell access point base station 23 which is connected to the core network 100. The local femto access point base station 23 may operate to receive wireless communication from allowed user equipment 2" in the home 21 and provide corresponding communication with the core network 100 via an IP wide area network, for instance.

FIG. 1 illustrates schematically certain user equipment 2, particularly a cellular phone 2, near the femto cell 4' which has no access to the femto network 4'. The access is not allowed because the maximum amount of devices 2" in the femto network 4 has already been reached, for instance. Consequently, a data transfer from the cellular phone 2 to the core network 100 via the local femto cell access point base station 23 is not permitted. As a result of the vicinity between the femto cell 4' and the cellular phone 2, also the data transfer 24 between the radio network controller 3 and the mobile phone 2 can be disturbed due to co-channel interference between the frequencies of the femto cell 4 and a certain carrier frequency for the data transfer 24 between the radio network controller 3 and the mobile phone 2 (the target frequency 11). The cellular phone 2 which has no access to the femto network 4' can be located in a "dead-zone" in close proximity to the femto network 4' or in a "grey-zone" at the edge of the femto coverage where macro quality can still be impaired. Normally in such cases the interfered macro base transceiver stations 22 will have at least one other clear frequency 10 to serve the affected "non-femto" cellular phone 2. A problem in the state of the art is that the radio network controller 3 is conventionally not aware of the interference that "non-femto" cellular phone 2 may be experiencing near a disallowed femto network 4'.

In accordance with an embodiment of the present invention, the radio network controller 3 performs a step of evaluating if a directed target carrier frequency 11 is interfered by the local access radio network 4 near the user equipment 2. Consequently, further redirection of the cellular phone 2 to a target carrier frequency 11 which interferes with the femto cell 4' is prevented by the radio network controller 3 for a certain time period and the data transfer 24 between the cellular phone 2 and the UTRA network based on the clear frequency is provided.

Figure 2:
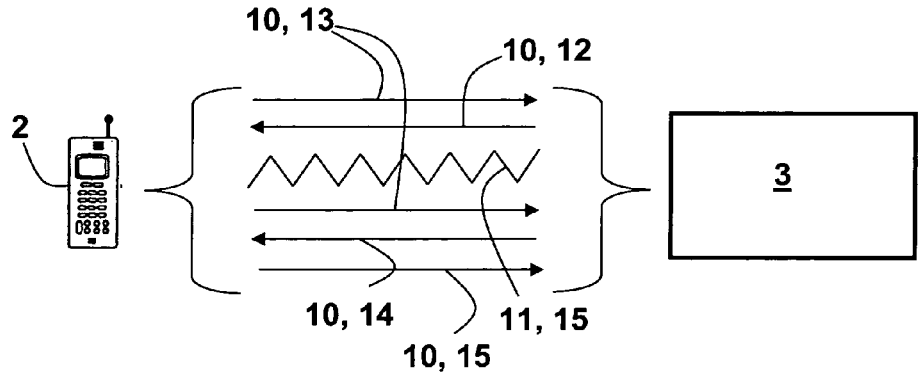
FIG. 2 illustrates schematically a call flow between user equipment and a radio network controller according to an exemplary embodiment of the present invention.

FIG. 2 illustrates schematically a call flow of a method in an exemplary embodiment, wherein the call flow between user equipment 2, particularly a cellular phone 2, and a radio network controller 3 according to the architecture of FIG. 1 is shown. The cellular phone 2 has no access to the femto cell 4', but is located near (in the "grey-zone") of the femto cell 4'. During state transition from RRC idle to cell_DCH, or from cell_FACH to cell_DCH, the radio network controller 3 has the option to redirect the cellular phone 2 to a different UTRA cell by specifying the IE "Frequency info" in the RRC connection setup or a Radio Bearer Reconfiguration message. The policy of the radio network controller 3 can include redirection the cellular phone 2 to a target frequency 11 which is an allowed frequency of the femto cell 4'. On the other hand, there is usually at least one frequency 10 that does not interfere with the femto network 4'. Hence, this frequency 10 can be used for undisturbed data transmission 24 between the radio network controller 3 and the cellular phone 2 via the macro cell. This frequency 10 is referred to as the clear frequency 10.

It is shown in FIG. 2 that the cellular phone 2, which has no access to the femto cell 4', transmits a first connection request 13 to the radio network controller 3 on the clear frequency 10. Subsequently, the radio network controller 3 transmits a connection setup message 12 (also referred to as transmission instruction 12) to the cellular phone 2 using also the clear frequency 10, wherein the connection setup message 12 includes a redirection of the cellular phone 2 to a certain target frequency 11 in accordance with the policy of the radio network controller 3, wherein the target frequency 11 is an allowed frequency for the femto cell 4'. As a result, the target frequency 11 is disturbed by the femto cell 4', because the cellular phone 2 is located in the "grey-zone" of the femto cell 4'. Consequently, the cellular phone 2 is not able to send a connection setup complete message 15 to the radio network controller 3 on the instructed target frequency 11. Instead, the cellular phone 2 has to send again a second connection request 13' on the clear frequency 10, wherein the radio network controller 3 transmits an additional connection setup message 14 on the clear frequency 10 without redirecting the cellular phone 2 to the interfered target frequency 11. Afterwards, the cellular phone 2 is able to send the connection setup complete message 15 on the clear frequency.

According to conventional systems, the additional second connection request 13' and the additional connection setup message 14 adds some delay to the call setup time, which is repeated every time the "non-femto" cellular phone 2 in the "grey-zone" or in "dead-zone" requests to set up an RRC connection on the clear frequency 10 and when the radio network controller policy dictates a redirection on the interfered target frequency 11. However, according to an embodiment of the present invention, the radio network controller 3 performing the method and/or the program evaluates that the cellular phone 2 is interfered by the proximity of the femto network 4' on the target carrier frequency 11 and identifies that the cellular phone 2 is necessarily located in the "grey-zone" or in the "dead-zone" of the femto network 4'. Because otherwise, the radio network controller 3 should not receive the additional second connection request 13', shortly after transmitting the first connection setup message 12 which includes the redirection of the cellular phone 2 to the target frequency 11. In an embodiment, the radio network controller 3 stores this information for a certain time period to prevent redirection the cellular phone 2 to the target frequency 11 again. Advantageously, prospective time delay establishing a connection can be avoided.

Figure 3:
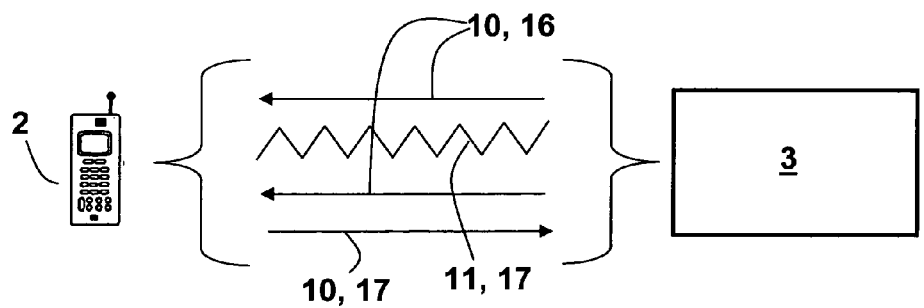
FIG. 3 illustrates schematically a call flow between user equipment and a radio network controller according to another exemplary embodiment of the present invention.

FIG. 3 illustrates schematically a further call flow 1 between the radio controller network 3 and the cellular phone 2 of a method according to another exemplary embodiment of the present invention, which is similar to the exemplary embodiment shown in FIG. 2. In the another exemplary embodiment shown in FIG. 3, the radio network controller 3 transmits a Radio Bearer Reconfiguration message 16 to the cellular phone 2 on the clear frequency 10. The radio network controller 3 orders a Radio Bearer Reconfiguration 16 from cell_FACH to cell_DCH, but the cellular phone 2 cannot send the Radio Bearer Reconfiguration Complete message 17 on the specified target frequency 11. According to the present invention, the radio network controller 3 identifies that at the location of the user equipment 2 the target carrier frequency 11 interferes with the femto cell 4'. In an embodiment, the radio network controller 3 stores this information for a certain time period to prevent an additional redirection of the cellular phone 2 to the target frequency 11 again.

The invention claimed is:

1. A method for handling communication between a user equipment and a radio network controller of a universal mobile telecommunications system radio access network, the method comprising the steps of:
   providing a transmission instruction by the radio network controller for redirecting the user equipment to a target carrier frequency, the target carrier frequency being an allowed frequency of a local access radio network;
   evaluating if the target carrier frequency is interfered by the local access radio network near the user equipment; and
   preventing, if the target carrier frequency is interfered by the local access network near the user equipment, a redirection of the user equipment to the target carrier frequency by the radio network controller for a time period;
   wherein the step of providing the transmission instruction is caused by a first connection request transmitted from the user equipment to the radio network controller, wherein the step of evaluating if the target carrier frequency is interfered by the local access radio network near the user equipment comprises a step of detecting if a second connection request of the user equipment is received by the radio network controller after transmitting a transmission instruction to the user equipment for redirecting the user equipment to the target carrier frequency, wherein the second connection request is effectively equal to the first connection request.

2. The method according to claim 1, wherein the transmission instruction comprises a radio bearer reconfiguration message for the user equipment, and wherein the step of evaluating if the target carrier frequency is interfered by the local access radio network near the user equipment comprises a step of detecting if one or more unsuccessful radio bearer reconfiguration messages have been subsequently transmitted to the user equipment for redirecting the user equipment to the target carrier frequency.

3. The method according to claim 1, wherein the step of evaluating if the target carrier frequency is interfered by the local access radio network near the user equipment comprises a step of detecting if the user equipment performs a number of ping-pong inter-frequency handovers from a clear carrier frequency to the target carrier frequency and back from the target carrier frequency to the clear frequency.

4. The method according to claim 1, further comprising the step of:
   initiating inter-frequency measurements performed by the user equipment concerning the target carrier frequency and scrambling codes of the local access radio network; and
   evaluating at least one of a signal strength and a signal quality in the inter-frequency measurements of the user equipment.

5. The method according to claim 1, wherein the step of evaluating if the target carrier frequency is interfered by the local access radio network near the user equipment comprises a step of evaluating if the user equipment is located inside or near the service area of the local access radio network.

6. The method according to claim 1, wherein the length of the time period depends on whether the user equipment is located inside or near the service area of the local access radio network.

7. The method according to claim 1, wherein the redirection of the user equipment to the target carrier frequency is prevented for a hysteresis time.

8. The method according to claim 7, wherein the hysteresis time is a static value or depends on predetermined parameters, wherein the predetermined parameters comprise at least one of a nominal hysteresis time, a recent mobility history of the user equipment, a signal strength and quality concerning the target carrier frequency, and scrambling codes of the local access radio network.

9. A tangible, non-transient computer-readable medium, of a radio network controller, having computer-executable instructions stored thereon, the computer-executable instructions, when executed, causing the radio network controller to perform a method for handling communication between a user equipment and a radio network controller of a universal mobile telecommunications system radio access network, the method comprising the steps of:
- providing a transmission instruction by the radio network controller for redirecting the user equipment to a target carrier frequency, the target carrier frequency being an allowed frequency of a local access radio network;
- evaluating if the target carrier frequency is interfered by the local access radio network near the user equipment; and
- preventing, if the target carrier frequency is interfered by the local access network near the user equipment, a redirection of the user equipment to the target carrier frequency by the radio network controller for a time period;
- wherein the step of providing the transmission instruction is caused by a first connection request transmitted from the user equipment to the radio network controller, wherein the step of evaluating if the target carrier frequency is interfered by the local access radio network near the user equipment comprises a step of detecting if a second connection request of the user equipment is received by the radio network controller after transmitting a transmission instruction to the user equipment for redirecting the user equipment to the target carrier frequency, wherein the second connection request is effectively equal to the first connection request.

10. The tangible, non-transient computer-readable medium according to claim 9, wherein the transmission instruction comprises a radio bearer reconfiguration message, and wherein the step of evaluating if the target carrier frequency is interfered by the local access radio network near the user equipment comprises a step of detecting if one or more unsuccessful radio bearer reconfiguration messages have been subsequently transmitted to the user equipment for redirecting the user equipment to the target carrier frequency.

11. The tangible, non-transient computer-readable medium according to claim 9, wherein the step of evaluating if the target carrier frequency is interfered by a local access radio network comprises a step of detecting if the user equipment performs a number of ping-pong inter-frequency handovers from a clear carrier frequency to the target carrier frequency and back from the target carrier frequency to the clear carrier frequency.

12. The tangible, non-transient computer-readable medium according to claim 9, wherein the computer-executable instructions, when executed, further cause the radio network controller to perform the steps of:
- initiating inter-frequency measurements of the user equipment concerning the target carrier frequency and scrambling codes of the local access radio network; and
- evaluating at least one of a signal strength and a signal quality in the inter-frequency measurements of the user equipment.

13. The tangible, non-transient computer-readable medium according to claim 9, wherein the tangible, non-transient computer-readable medium is part of a computer program product.

* * * * *